Feb. 4, 1969  J. S. OLASZ  3,425,130
ADJUSTMENT FEELER HOLDER
Original Filed May 3, 1966
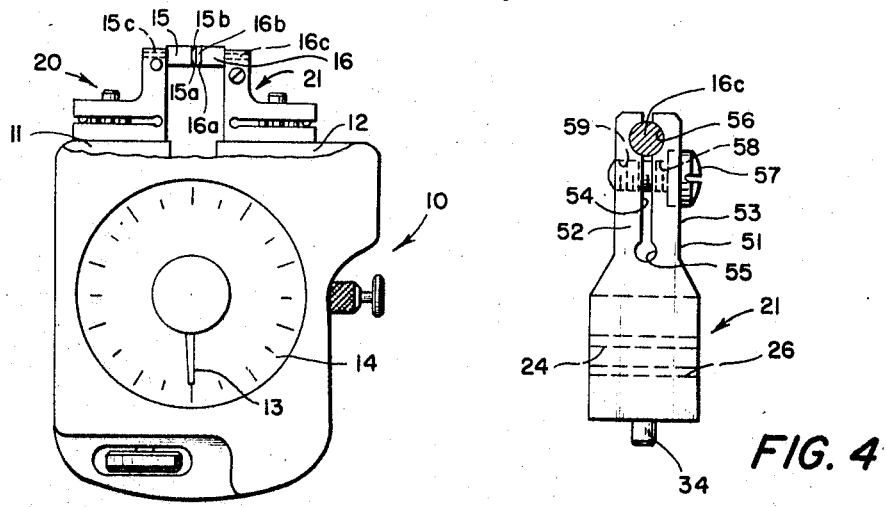
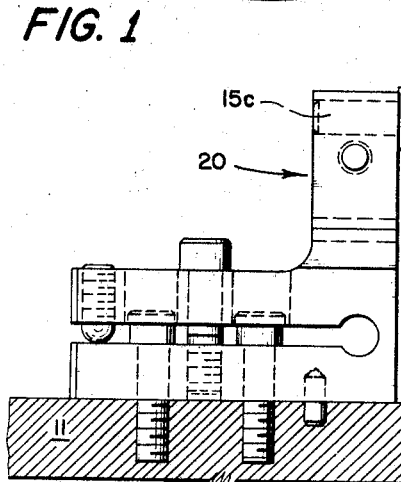
FIG. 1
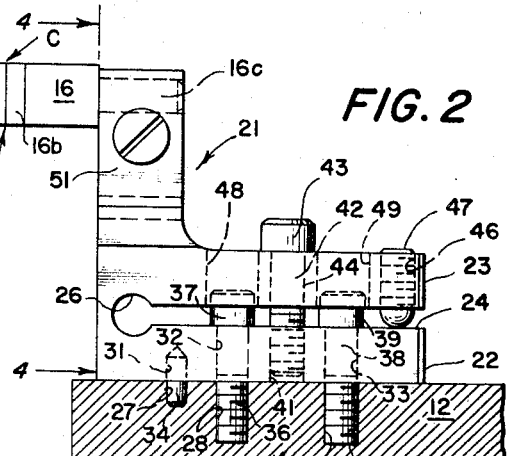
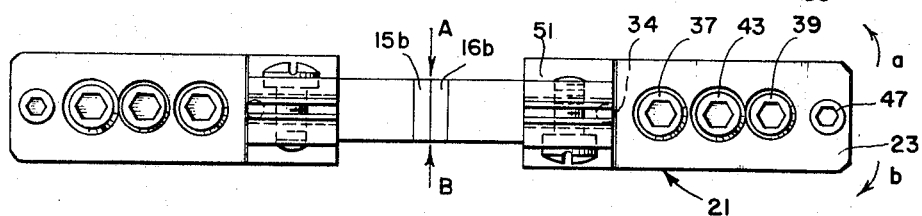
FIG. 3
INVENTOR
JOSEPH S. OLASZ
BY LeBlanc & Shur
ATTORNEYS United States Patent Office 3,425,130
Patented Feb. 4, 1969

3,425,130
ADJUSTMENT FEELER HOLDER
Joseph S. Olasz, Lancaster, Pa., assignor to Hamilton Watch Company, Lancaster, Pa., a corporation of Pennsylvania
Continuation of application Ser. No. 547,368, May 3, 1966. This application Oct. 25, 1967, Ser. No. 678,113
U.S. Cl. 33—143    12 Claims
Int. Cl. G01b 5/00, 3/00, 3/32

ABSTRACT OF THE DISCLOSURE

The gauge has oppositely facing feelers, each feeler being carried by an element mounted on support blocks, at least one of the mounting elements being movable such that at least one feeler moves toward and away from the other feeler. Each mounting element comprises a pair of superposed jaws connected by adjustable screws for pivoting the feeler about a horizontal axis. Each mounting element is pivotally mounted on its associated support block and has screw means passing through the lower jaw into the support block whereby the screw means may be loosened and the mounting element pivoted about an axis perpendicular to the first mentioned axis.

*Background and summary of the invention*

The present application is a continuation of copending application Ser. No. 547,368, filed May 3, 1966, now abandoned.

The present invention relates to a gauge, and more particularly to a gauge having a pair of opposed feelers which are adjustably mounted to support elements of the gauge for adjusting movement about two axes.

Gauges are widely used to determine external or internal dimensions of manufactured parts, and the like, and generally include a pair of support blocks, at least one of which is movable towards and away from the other. Mounted on or integral with the support blocks are feelers which contact the work piece being measured. An indicator of some type is usually incorporated in, or attached to, the gauge, and this indicator frequently includes a rotating needle which cooperates with a suitable scale. Gauges of this general construction are disclosed in copending application of Joseph S. Olasz et al. filed Nov. 3, 1964, Ser. No. 408,548, now U.S. Patent No. 3,315,364; other gauges of this general construction are shown in Patents 2,309,891, 2,646,627 and 3,002,284.

In the measurement of work pieces, particularly in the very accurate measurement of relatively small work pieces such as the parts of watches and the like, it is necessary that opposed planar faces of the feelers be as nearly parallel as possible. It will be readily understood that if the feeler surfaces are planar, but are not parallel, an inaccurate measurement will necessarily result unless by chance the particular portions of the feeler surfaces which are the indicated distance apart are the portions which engage the work piece being measured.

In order to obtain true parallelism of the two opposed feeler surfaces, it has heretofore been the practice to place the feelers in support means which were in position on the gauge, and to then lap the faces of the feelers with an abrading and/or polishing element which itself had to be provided with oppositely disposed parallel working surfaces. Proceeding in this manner, the lapping operation required as many as sixteen hours to complete, and in any event has been found to be an extremely time consuming and therefore expensive procedure for providing the gauge feelers with the necessary parallel surfaces. While it is also possible to grind the surfaces of the feelers, this is also an undesirable and unsatisfactory procedure.

According to the present invention it has now been found that it is possible to provide gauge feelers mounted in such a way that it is feasible to achieve parallelism of the feeler surfaces without the aforementioned lapping or grinding operations in only a small fraction of the time previously required to achieve such a condition.

It is accordingly a primary object of the present invention to provide a gauge feeler arrangement wherein parallelism of the feeler surfaces may be achieved in a simpler fashion and shorter time than heretofore possible.

Another object of the present invention is to provide a gauge construction in which planar surfaces of feelers may be readily brought into parallel relationship.

Another object of the present invention is the provision of a gauge having feelers with surfaces which may be brought into parallelism without expensive lapping or grinding operations.

Yet another object of the present invention is to provide a gauge having feelers which may be readily adjusted to bring the feeler surfaces into parallelism.

A further object of the present invention is the provision of a gauge having feelers supported so that they may be readily adjusted about two axes, in order to bring the feeler surfaces into parallelism.

Other objects and many of the attendant advantages of the present invention will be readily understood from the following specification and drawings wherein:

FIG. 1 is a view of a gauge in accordance with the present invention, with parts broken away;

FIG. 2 is an enlarged elevational view of the feelers and feeler holders forming a part of the gauge shown in FIG. 1, with parts in section;

FIG. 3 is a plan view of the feelers and feeler holders shown in FIG. 2; and

FIG. 4 is a cross sectional view taken on the line 4—4 of FIG. 2.

Referring now to the drawings, wherein like or corresponding reference numerals are used to designate like or corresponding parts throughout the several views, there is shown in FIG. 1 a gauge generally designated 10 and including support blocks 11 and 12. At least one of the support blocks 11 or 12 is movable towards and away from the other of the support blocks by suitable means, and the movement, through suitable linkage, causes the needle 13 to rotate and move over the dial or scale 14. Needle 13 and scale 14 thus cooperate to indicate the dimension of a work piece being measured.

Feelers 15 and 16 are provided, each having, preferably, a carbide tip 15a and 16a, carbide tip 15a having a flat surface 15b and carbide tip 16a having a flat surface 16b. Feeler 15 is provided with a reduced extension 15c and feeler 16 is provided with a reduced extension 16c, these extensions being held in substantially identical mounting means 20 and 21.

Referring now to FIG. 2, mounting element 21 has a lower jaw 22 and an upper jaw 23 which are separated by a slit 24 having a cylindrical enlargement 26 at its left-hand or inner end. The jaws 22 and 23 are integral and may pivot relative to each other about the axis of cylindrical enlargement 26. Cylindrical enlargement 26 and its axis are shown as extending horizontally, and mounting element 21 is preferably of a metal such as steel, so that it is resilient.

Support block 12 is provided with a vertically extending bore 27, and a pair of spaced, tapped bores 28 and 29, these three bores having their axes in a common plane. The lower jaw 22 has a blind bore 31, and a pair of bores 32 and 33 extending therethrough. A pivot pin 34 extends in the bore 27 of support block 12 and the bore 31 of lower jaw 22, and permits the entire mounting element 21 to rotate about the axis of pin 34. A screw 36 extends through the bore 32 and is threaded into the tappered bore 28, screw 36 being smaller in diameter than the bore 32 so as to provide for movement of jaw 22 and mounting element 21 about the axis of pin 34 while screw 36 is engaged with tapped bore 28. Screw 36 has an enlarged head 37 which engages the upper surface of lower jaw 22. In similar fashion, a screw 38 is threadedly engaged in tapped bore 29, passing through the hole 33, screw 38 having an enlarged head 39.

Lower jaw 22 is provided with a tapped bore 41 into which is threaded a screw 42 having an enlarged head 43 and which passes through a bore 44 in upper jaw 23. A tapped bore 46 is provided near the free end of upper jaw 23, and receives a set screw 47, the lower end of which bears against the upper surface of lower jaw 22. Upper jaw 23 is also provided with a pair of holes 48 and 49 which partially receive the heads 37 and 39 of the screws 36 and 38, these holes permitting the passage of the screws 36 and 38 during assembly, and their manipulation after assembly.

Referring now to FIG. 3, there may be seen the upper jaw 23 of mounting element 21, with the pivot pin 34 and the screw heads 37, 43, 39 and 47, in a common plane. Extending upwardly from the jaw 23 is a post 51 which may be seen in FIG. 4 to comprise a pair of jaws 52 and 53 separated by a slit 54 having at its lower end a cylindrical enlargement 55 and adjacent its upper end a cylindrical enlargement 56. A screw 57 passes through a hole 58 in jaw 53 and is threaded into a tapped bore 59 in jaw 52, screw 57 extending horizontally as shown. The upper enlargement 56 receives the extension 16c of feeler 16, and is held firmly in position by the clamping action of jaws 52 and 53 and screw 57.

In setting up the gauge 10, a master measuring wire or ball is positioned between feeler surfaces 15b and 16b. If it is determined that the feeler surfaces are open at A (see FIG. 3) the screws 36 and 38 are loosened slightly and mounting element 21 is tapped so as to rotate it in the direction $a$ about pivot pin 34. Screws 36 and 38 are then retightened. If there had been an opening at B, this procedure is used, except that the mounting element 21 is rotated in the direction $b$. If there is separation of the feeler surfaces 15b and 16b at C, as shown in FIG. 2, screw 42 is loosened and screw 47 is tightened until parallelism is achieved, and conversely if the opening had been found at D, screw 47 is loosened and screw 42 tightened to achieve parallelism.

Mounting element 20 is a mirror image of mounting element 21 in construction, and may be similarly adjusted to assist in bringing the feeler surfaces 15b and 16b into parallelism.

By the above described procedure, the herein described gauge may be relatively quickly and conveniently adjusted to bring the feeler surfaces into parallelism. Consequently, the present invention provides a gauge in which adjustment is rapid and inexpensive, and which avoids the time consuming and expensive operations necessary with prior gauges.

While the feelers which are illustrated are intended for making measurements of outside dimensions it will be obvious to those skilled in the art that they are readily adapted to making measurements of inside dimensions by simply reversing the directions of the feelers 15 and 16 so that the surfaces 15b and 16b face outwardly. Alternatively, the arrangement permits the ready substitution of other feelers to provide a large degree of versatility.

The inventii may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a gauge, a pair of feelers having substantially planar feeler surfaces, means mounting one of said feelers on said gauge for pivotal movement about two angularly related axes thereby to attain parallelism of said feeler surfaces, said mounting means including a pair of pivoted jaws and movable means for positively adjusting the relative position of said jaws, said one feeler being positively pivoted about one of said axes in response to movement of said adjusting means, and movable means for adjustably spacing one of the feeler surfaces from the other.

2. In a gauge as set forth in claim 1, said jaws being integral, and said positive adjusting means comprising screw means in operative relationship with said jaws.

3. In a gauge according to claim 1 including means mounting the other of said feelers on said gauge for pivotal movement about two angularly related axes, said latter mounting means including movable adjusting means for positively pivoting said other feeler about one of said axes, said other feeler being pivoted in response to said movement of said latter adjusting means.

4. In a gauge according to claim 1 wherein said latter movable means comprises a support, said mounting means being pivotally connected to said support, and releasable means for securing said mounting means in an adjusted position on said support.

5. In a gauge according to claim 1 wherein said axes lie in perpendicular planes.

6. In a gauge, movable support means, a feeler having a substantially planar feeler surface, means mounting said feeler on said support means for pivotal movement about two angularly related axes, said mounting means being pivotally connected to said support means, releasable means for securing said mounting means in an adjusted position on said support means, said mounting means having holes therethrough and said releasable means having screws of smaller diameter than said holes extending therethrough, and tapped bores in said support means receiving said screws.

7. In a gauge, movable support means, a feeler having a substantially planar feeler surface and means adjustable about two axes for mounting said feeler on said support means, said mounting means being pivotally connected to said support means, releasable means for securing said mounting means in an adjusted position on said support means, said mounting means having first and second jaws, said releasable means being in operative relationship with said first jaw, said second jaw being connected to said first jaw about an axis at an angle to the pivotal connection between said support means and said mounting means, said mounting means including releasable means for adjusting the relative position of said jaws.

8. In a gauge as set forth in claim 7 wherein said jaw adjusting means comprises means for positively pivoting said feeler about said angularly related axes.

9. In a gauge as set forth in claim 7, said angle being a right angle.

10. A gauge attachment comprising a feeler having a substantially planar feeler surface, a mounting means for mounting said feeler on a gauge support, said feeler being removably mounted in said mounting means, said mounting means having a base jaw adapted to be fastened to said gauge support, said base jaw carrying an upper jaw extending above said base jaw in spaced relation thereto and being connected to said base jaw in resilient fashion, a first screw screw-threadedly engaging said base jaw and passing through and engaging said upper jaw whereby adjustment of said screw moves said upper jaw relative to said base jaw, a second screw screw-threadedly engaged in said upper jaw and having an end engaging said base jaw, means to attach said mounting means to said gauge support, said last named means including pivot means for pivotally attaching said base jaw to said gauge support and screw means for locking said base jaw to said gauge support, movement of said mounting means about said pivot means and movement of said upper jaw about its resilient connection to said base jaw providing movement of said planar feeler surface about a pair of substantially perpendicular axes.

11. A device as set out in claim 10 wherein said feeler is secured to said mounting means by a pair of upwardly extending jaws attached to said upper jaw adjacent the point of attachment of said upper jaw to said base jaw, and means for clamping a portion of said feeler between said upwardly extending jaws.

12. A device as set out in claim 11 wherein said base and upper jaws extend substantially parallel to one another and are separated by a slot, said jaws being attached together by said resilient connection at one end of each jaw whereby said slot has one open end, said pivotal means associated with said base jaw being adjacent said connected ends, said screw screw-threadedly engaging said upper jaw and engaging said lower jaw being at the opposite end of said upper jaw, said screw screw-threadedly engaging said base jaw and engaging said upper jaw being disposed between said last named screw and the connected ends of said jaws.

References Cited

UNITED STATES PATENTS

| | | |
|---|---|---|
| 862,765 | 8/1907 | Schaffer. |
| 1,634,019 | 6/1927 | Coullery _____ 33—163 |
| 2,608,947 | 9/1952 | Ames. |

FOREIGN PATENTS 238,979  9/1925  Great Britain.

HARRY N. HAROIAN, *Primary Examiner.*